United States Patent
Blecher

[15] 3,697,161
[45] Oct. 10, 1972

[54] CIRCULAR TRAY SUPPORT AND INDEXING APPARATUS
[72] Inventor: Stephen Blecher, Littleton, Colo.
[73] Assignee: Honeywell Inc., Minneapolis, Minn.
[22] Filed: April 1, 1970
[21] Appl. No.: 24,582

[52] U.S. Cl. ................................353/117, 353/107
[51] Int. Cl. .............................................G03b 23/06
[58] Field of Search............353/103, 107, 353/117, 40/78, 78.07, 79

[56] References Cited

UNITED STATES PATENTS 3,409,353  11/1968  Zillmer..........................40/79
3,359,668  12/1967  Badalich....................353/117

FOREIGN PATENTS OR APPLICATIONS 1,907,311  9/1969  Germany...................353/103

Primary Examiner—Robert B. Hull
Assistant Examiner—Steven L. Stephan
Attorney—Arthur H. Swanson, Lockwood D. Burton and J. Shaw Stevenson

[57] ABSTRACT

A unique elongated indexing means and bowed shaped tray supporting means for use in a slide projector to enable circular trays that are of different diameters to be rotatably supported on a common support and to enable each of these different size trays to be indexed by a common indexing means.

7 Claims, 8 Drawing Figures

PATENTED OCT 10 1972 3,697,161

INVENTOR.
STEPHEN BLECHER
BY John Shaw Stevenson
AGENT.

INVENTOR.
STEPHEN BLECHER
BY
John Shaw Stevenson
AGENT.

INVENTOR.
STEPHEN BLECHER
BY
John Shaw Stevenson
AGENT.

CIRCULAR TRAY SUPPORT AND INDEXING APPARATUS

It is an object of the present invention to disclose a trough structure for rotatably supporting different size circular trays thereon that carry a different number of slides therein and which may be of different diameters.

More specifically, it is another object of the present invention to disclose a tray receiving structure having a pair of spaced apart bowed shaped lugs on different contacting surfaces of which annular portions of different size trays can be supported on a wall that forms a trough of a slide projector.

It is another object of the present invention to provide an indexing pinion that is purposely elongated in a vertical direction away from the bottom of the trough so that different peripheral surfaces of this pinion can be engaged with the indexing teeth on different size trays even though the teeth on the respective trays are spaced inwardly at different distances from their respective outer peripheral surfaces.

It is another object of the present invention to provide a contact point on the opposite side of each of the aforementioned trough so that the tray will be retained in the trough while it is supported on the aforementioned spaced apart bowed shaped supporting surfaces and while the indexing pinion is rotating the tray in a clockwise or counterclockwise direction.

It is another object of the present invention to provide a first form in which each one of the aforementioned spaced apart tray supporting surfaces contain a protuberance that is integral with and extends from a point that is slidably mounted in each of two wall portions that form apertures in a side wall of the trough of a slide projector.

It is still another object of the present invention to provide a second form of the aforementioned slide tray support that has a pivotally adjustable plate with two spaced apart bowed shaped tray supporting surfaces thereon which can be selectively moved between a stowed away position and other different tray supporting positions on a slide projector to provide a rotatable support for circular trays of different diameters.

It is another object of the present invention to provide a sturdy support and simultaneous free rotation of the periphery of a slide tray with respect to the base of a trough of a slide projector and thereby minimize the friction that must be overcome by the tray indexing means in carrying out its tray advancing and reversing operation.

A better understanding of the present invention may be had from the following detailed description when read in connection with the accompanying drawings in which.

Figure 1:
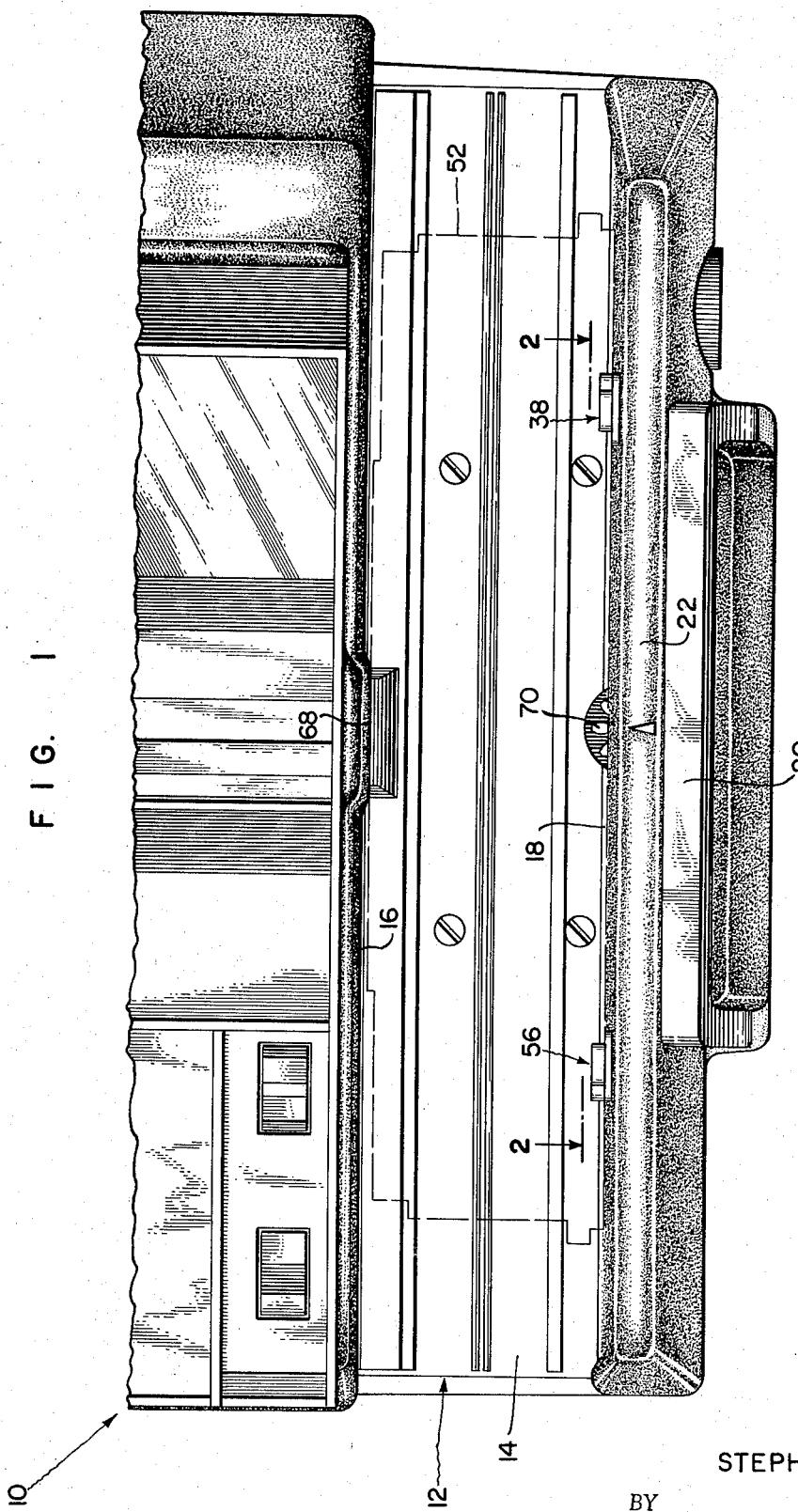
FIG. 1 is a plan view of the tray supports on a trough of a slide projector showing the tray supported thereon in dot dash line form.

The projector structure 10 shown in FIGS. 1—4 has a trough 12 and that is comprised of a base 14 and two side walls 16, 18. The projector 10 is also provided with a handle 20 that is pivotally mounted on a exterior wall portion 22 that in turn provides a removable cover for the upper edge 24 of the side wall 18 of the trough 12.

Figure 2:
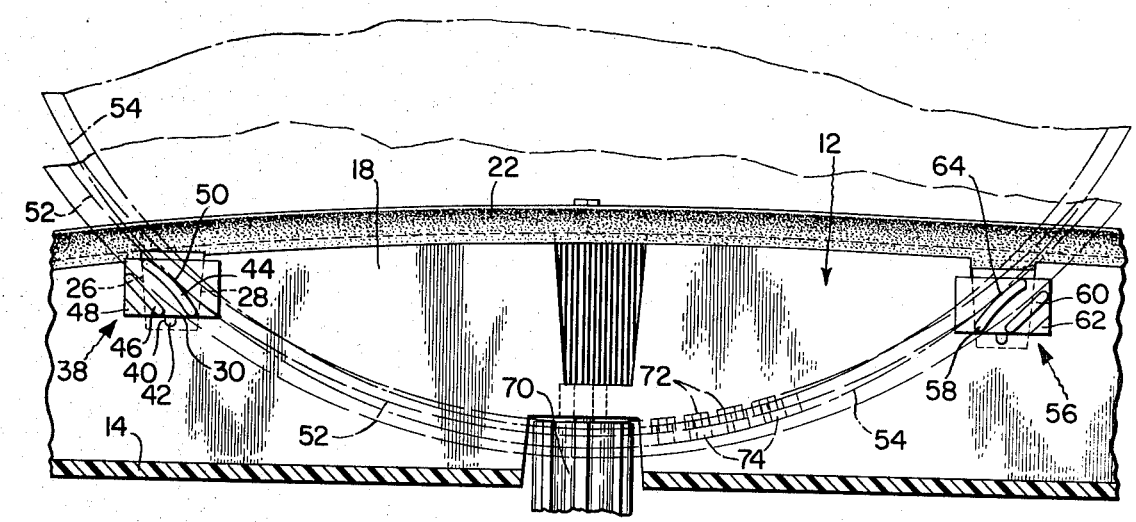
FIG. 2 is a section taken along the line 2—2 of FIG. 1, to indicate how the unique construction of the tray supports and indexing pinion can provide a common supporting and indexing means for different size trays whose peripheral portions are shown respectively in dash and dot-dash line form.
Figure 3:
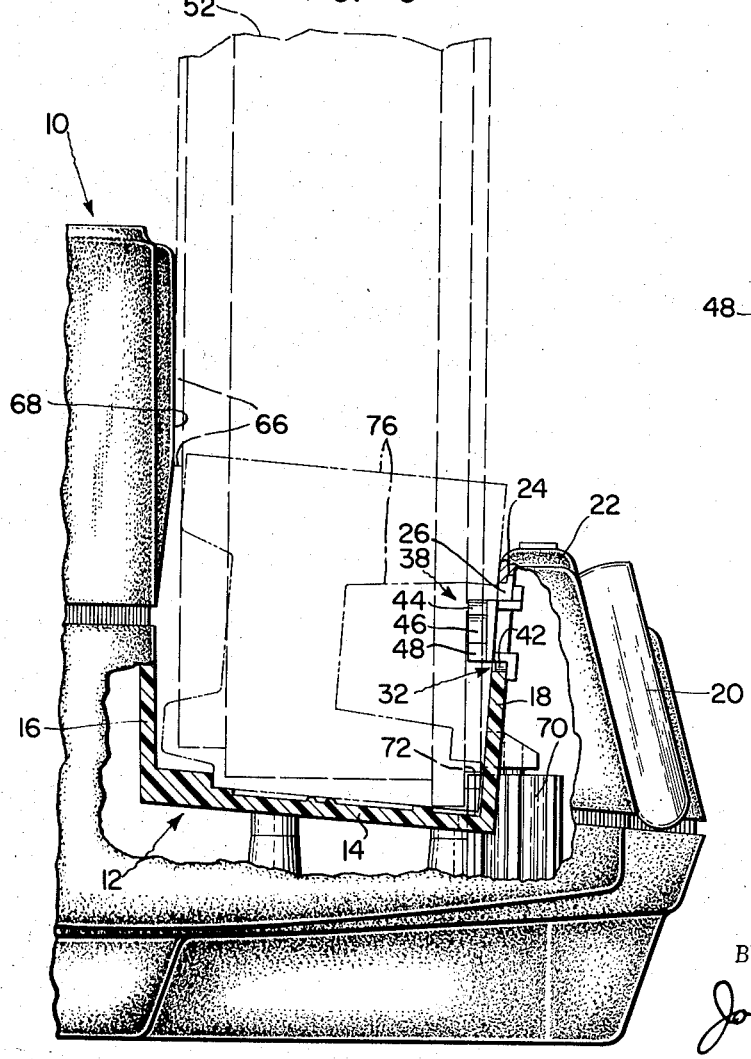
FIG. 3 shows an elevational view of the tray supports and indexing means shown in FIGS. 1 and 2 and how a typical tray, shown in dash dot line, that is capable of carrying one hundred and twenty slides is associated with respect to these supports and indexing means.
Figure 4:
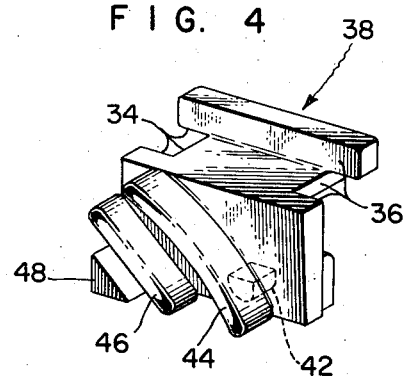
FIG. 4 shows a tray support member having an upper curved protuberance thereon on which peripheral portions of trays of different diameters can be supported.

As can best be seen in FIG. 2 the two vertical wall portions 26, 28, and horizontal wall portion 30 provides a slotted out area 32 extending downward from the upper edge portion 24 of the side wall 18 of the trough 12, the edges of wall portions 26 and 28 forming this slotted out area 32 provide guides along which portions 34, 36 of a tray support member 38 is slidably moved through the upper edges 24 into the position shown in FIGS. 2 and 3 before the removable extension wall portion 22 that is connected to a stationary part of the projector, is assembled over the edge 24.

The third edge of wall portion 30 forming the slotted out area 32 has a centrally located U-shaped portion 40 into which a curved shaped lug 42 of member 38 is slidably engaged to centralize the tray support member 38 in a fixed tray position in the wall 18 of the trough 12 and to prevent it from being moved to the right or left of the position shown in FIG. 2.

The inner face of the tray support member 38 has a series of protuberances 44, 46, 48 extending inwardly from the side wall 18 of the trough 12.

As is best shown in FIG. 2 the upper protuberance 44 is of a characteristically bowed shaped configuration and is employed to provide a contact area and support at 50 for the outer peripheral portions of the teeth formed on either a large size 120 slide capacity tray 52 or a tray 54 that is of a smaller diameter.

FIG. 2 shows a second tray support member 56 supported in the side walls 18 of trough 12 in the same manner as tray support 38. This second tray support 56 has protuberances 58, 60, 62 which are of the same height as those formed on the tray support 38 but differ therefrom in that these protuberances 58, 60, 62 are located to the opposite hand of those shown on support 38. Protuberance 58 provides a second contact and support 64 for supporting another portion of either the aforementioned circular trays 52, 54 that are of different diameters.

As is best shown in FIG. 3 the lower portion of an inner ring 66 formed on the left face of the tray 52 contacts the right surface of an embossed portion 68 of the projector 10 to thereby provide a bearing surface along which the outer surface of the ring 66 can be rotated. Another purpose of this embossed portion 68 is to retain the tray in an upright position on the support 38, 56, before, during and after the time the elongated index pinion 70 engages the teeth 70 on the periphery of the tray to effect the rotatable step by step movement of either tray 52 or 54.

It should be noted and explained that the indexing pinion 70 is purposely constructed in elongated fashion in an upward direction away from the base of the trough 12 so that it can accommodate either a small diameter tray e.g. one that provides only a 100 slide capacity such as the tray that is disclosed in detail in the U.S. Design Pat. No. 202.141 or a larger 120 slide capacity tray 52 that is disclosed in detail in the Stephen Blecher U.S. Design Pat. Application, Ser. No. 15081, filed Dec. 23, 1968. It should be noted that the indexing teeth 72, 72 on the aforementioned larger tray 52 extends inwardly and in a ring shaped fashion from a peripheral portion of this tray 52 that is spaced inwardly of another outer most peripheral portion of this tray indexing teeth e.g. 74, 74 on the aforementioned small tray 54 extends inwardly and in a ring shaped fashion directly from the outer most periphery of the tray.

Because of the aforementioned difference and other differences which exist e.g. in the overall diameters of the aforementioned trays it has heretofore been impossible for a person who purchases a slide projector to make full use of these different trays because tray supports that have heretofore been provided with such slide projectors do not accommodate the support and common indexing of these different trays.

For this reason it can be seen that the circular tray supports 38, 56, and index pinion 70 are purposefully constructed and positioned so that they could be used in a slide projector to support and index circular trays that possess different peripheral surfaces and which may be any one of a number of different diameters.

It can also be seen that the circular tray supports 38, 56, and index pinion 70 are purposefully constructed and positioned so that any one of a variety of commonly employed commercially available rectangular trays such as the tray 76 can be substituted for either of the aforementioned different circular size trays 52, 54, in the manner illustrated in FIG. 3 so that these rectangular trays can be properly supported in the trough 12 and indexed by the pinion 70. This pinion 70 is purposefully provided with bands of teeth that are displaced axially along the pinion in order to provide different curcumferential contacting surfaces of the pinion against which each of the different sized trays are engaged.

FIGS. 5—8 shows another means to rotatably support the previously mentioned different rotatable circular trays of different diameters 52, 54, in a trough 12 of the projector 10.

The rotatable support 78 has a mounting bracket 80 having a lower vertical portion 82 that is adapted for insertion in a wall portion 90 that forms a slot in the top of the wall of the projector 10. A portion 82 of the bracket 80 is supported in fixed relation to the wall of the projector 10 by means of the screws 92, 94, 96, 98.

The bracket 80 has a centrally located bent portion 100 and an upper vertical portion 102 that has a segment shaped portion 104.

Figure 6:
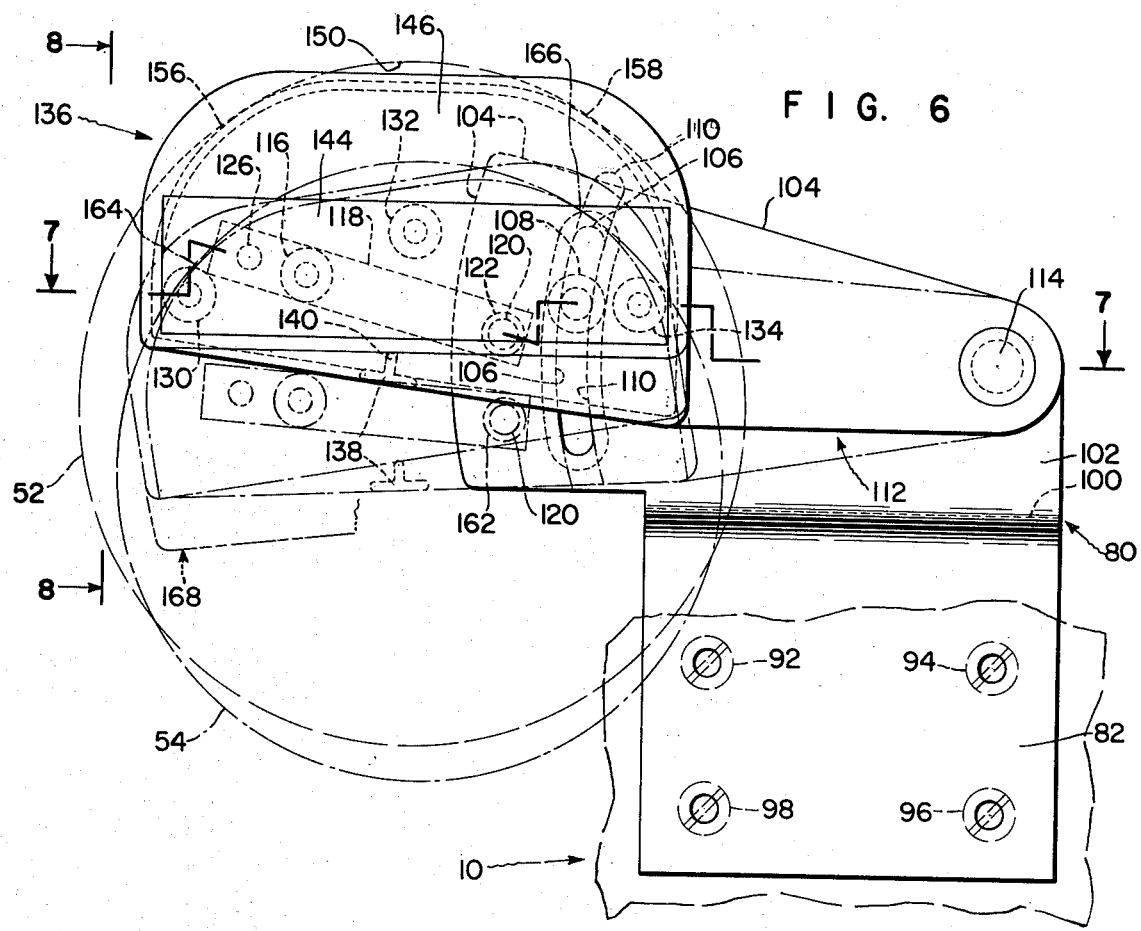
FIG. 6 shows in solid line form the position of the tray support arm when it is supporting a rotatable tray of one diameter that is shown in dash line form and further shows the tray support arm in dash dot lines to indicate the position that the bracket will be in when it is required to support a tray of a different diameter as is also illustrated in dot-dash line form.

An arc shaped countersunk slotted out wall portion 106 is formed in the segment shaped portion 104 of the bracket 102. A double headed cylindrical shaped plate retaining roller 108 is shown extending through the apertured wall portion 106 and through an apertured wall portion 110 in an arm member 112 that is of an arcuate shape configuration. FIG. 6 shows that the lower end of the apertured wall portion forming the slot in arm 112 is open and the opposite end is closed.

The member 112 is turn is shown pivotally mounted for arcuate movement on the stationary bracket portion 102 by means of a pivot pin 114.

A rivet 116 is employed to retain one end of a rectangular shaped leaf spring 118 in a fixed relation with the arm 112 so that the other end of this spring 118 can apply a spring force to a sphere 120. The sphere 120 in turn is mounted in a cylindrical apertured wall portion 122 of arm 112 and extends into contact with an adjacent cylindrical edge of the wall shaped detent 124 formed in the portion 104 of the stationary bracket 80. The left end of the leaf spring 118 is retained in a non rotatable position by means of a half shear slug 126 that protrudes out of the arm 112 into an apertured wall 128 formed in leaf spring 118.

The outer portion of the arm 112 is fixedly connected by means of the rivets 130, 132, 134, to a tray supporting member 136. The tray supporting member 136 is provided with an inverted tee-shaped protuberance 138 that is aligned and fitted in a snug manner into a corresponding tee-shaped slotted out wall 140 formed in the lower edge of the arm 112. This will maintain the arm 112 and member 136 in the aligned position shown before, during, and after these parts are finally connected to one another by the rivets 130, 132, 143.

Figure 7:
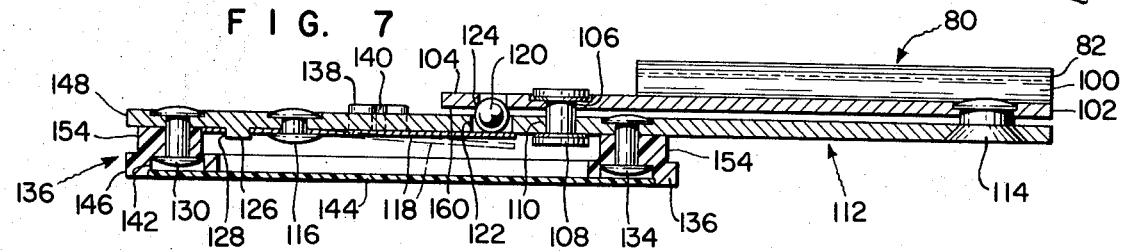
FIG. 7 is a sectional view taken along the lines 7—7 of FIG. 6.
Figure 8:
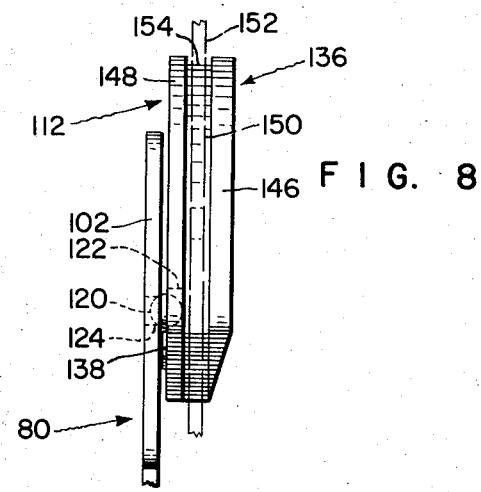
FIG. 8 shows an end view taken along the lines 8—8 of FIG. 6 and to show how a side ring portion that forms a face portion of a typical tray is aligned with the support arm when the tray is mounted thereon.

It can best be seen in FIGS. 6, 7, and 8, that the outer front surface of the tray supporting member 136 has an indented rectangular shaped surface 142 into which the edges of a corresponding rectangular shaped cover plate 144 can be attached by a suitable adhesive coating.

The flange portion 146 on the tray support member 136 and the flange 148 formed by the outer edge of the arm 112 provide two opposite six side portions between which an inner peripheral edge 150 of a flange shaped ring 152, that is formed on the inner edge of the tray 52, can be manually brought into rotatable laterally restricted engagement with the support surface 154 of tray 52. As is best shown in FIG. 6 this engagement only takes place at the contact line 156, 158.

Mounting of the aforementioned largest of the two trays 52 in the aforementioned manner is accomplished when the arm 112 and the tray support member 136, integrally connect thereto, are in the solid line position shown in FIG. 6 and 7 previously described.

When it is desired to substitute the circular tray 54 that is of a smaller diameter for the larger tray 52 the larger tray is removed and the arm 112 and its associated tray support member 136 are rotated in a downward counterclockwise direction about pivot 114 to the dot dash line position shown for these tray support parts 112, 136, in FIG. 6.

While this last mentioned movement takes place the spherical detent 120 will be forced out of contact with the wall forming the aperture wall 122 in the stationary bracket portion 102 and against the bias of spring plate 118 and thence into contact with an outer portion of the front surface 160 of the stationary bracket portion 102.

As further movement of the tray support parts 112, 136 takes place a point will be reached where the sphere 120 will be brought directly over a second sphere receiving wall 162 that forms another aperture in the bracket portion 102. The spherical detent 120 will under this last mentioned condition be forced to enter the top portion of the aperture wall 162 due to the bias leaf spring 118 acting thereon. This last mentioned bracket engaging position of the sphere 120 will be similar to the solid line position that the sphere was in when the tray support was in the first large tray supporting position as shown in solid line form in FIG. 7.

When the tray support parts 112, 136 have been moved into the dot dash line small tray supporting position shown for these parts the edge of the flange on the inner face surface of the small tray 54 can then be engaged for rotation on the support surface 154 along the contact line 164, 166.

Figure 5:
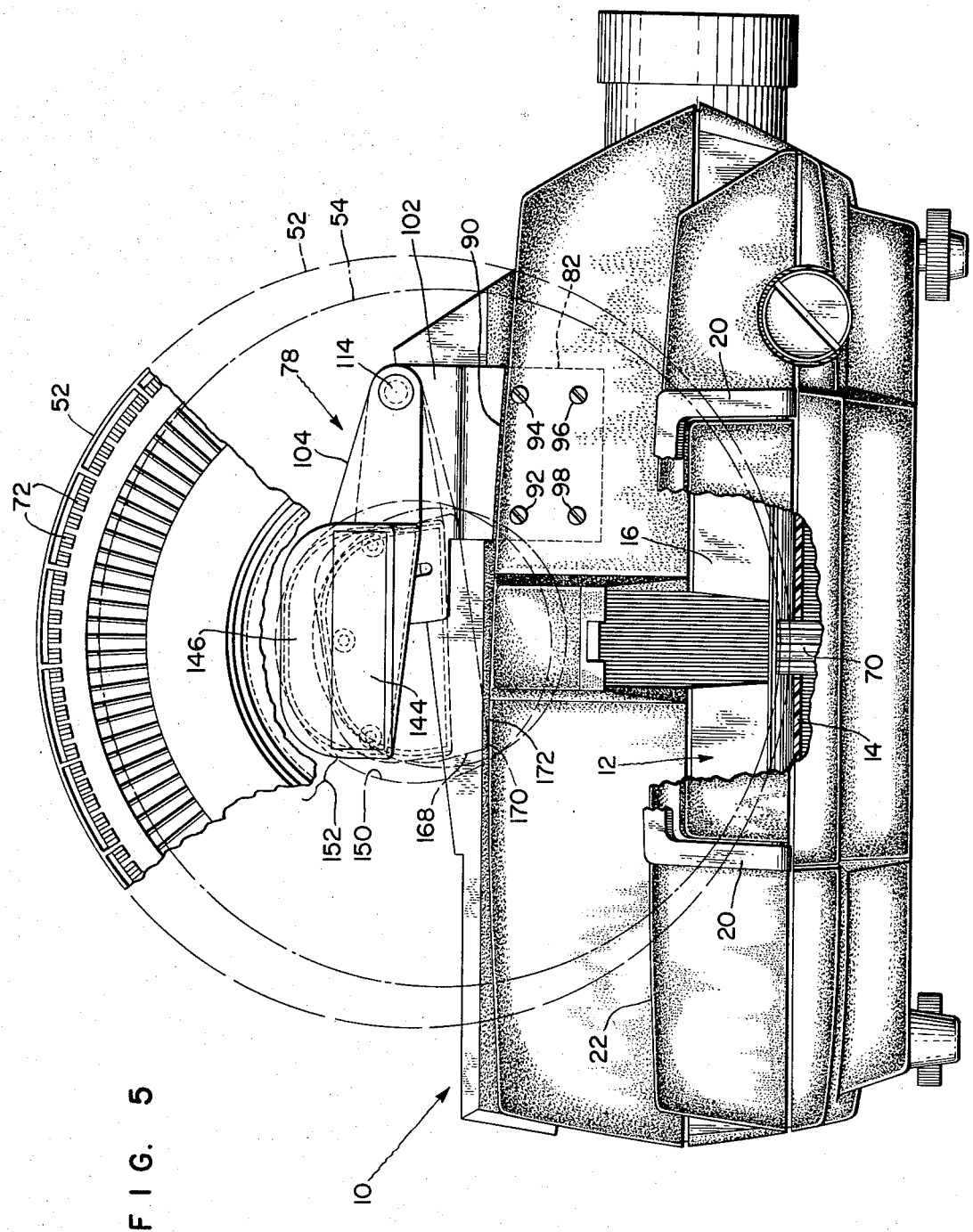
FIG. 5 shows an elevation view of another form of the tray support member as indicated in solid line form for supporting a first round tray of one diameter thereon when the support member is in a first position and for supporting a second round tray of another diameter thereon when this support member is moved to a second dotted line position.

It can also be seen in FIG. 5 that the tray support parts can be moved further in a downward counterclockwise direction to a third position 168 that is shown in dash dot line form where its outer lower edge 170 contacts the upper side edge 172 of the projector 10. In this last mentioned position the tray support parts 112, 136 are immediately above one side of the trough 12 and in a position where it can be stowed when not in use.

It should be understood that in some applications of the previously referred to tray supporting and indexing means for trays that are of different diameters and which have different peripheral constructions it may be desirable to provide additional apertures in other portions 102 of the stationary bracket 80 than those already referred to that are in line with the travel of the ball detent 120 carried by the arm 112.

In this way the ball detent 120 in the rotatable arm 112 can be selectively engaged with a selected one of these additional apertures so that the tray support parts 112, 136, after moving to their stowed position may be retained in that position or when moved to any one of the other additional aperture engaging positions may be employed to support and index a tray in that position.

The embodiments of the invention in which an exclusive property or privilege is claimed are defined as follows:

1. An apparatus for supporting and indexing circular trays of different diameters on a projector, comprising a pair of spaced apart bowed shaped members operably connected to a vertical side wall of a trough of the projector to support any two spaced apart portions of an outer annular surface of any one of said different size diameter circular trays thereon in a substantially vertical position and for rotary movement about a horizontal axis that passes through the center of any selected one of said different sized trays, said projector having a unitary elongated indexing pinion operably positioned thereon and forming a series of axially displaced bands of teeth, and a different one of said bands being positioned for engagement with indexing teeth formed on a different one of said supported trays that are each of a different diameter.

2. The circular tray supporting and indexing apparatus defined in claim 1 wherein the bowed shaped members are positioned in different angularly displaced positions from one another about said central horizontal axis of any selected one of said different sized trays.

3. The tray supporting and indexing apparatus defined by claim 1 wherein each of the supporting members have a mounting portion that is fixedly retained in the vertical wall forming a slotted out portion of said trough and wherein the bowed shaped members are in the form of protuberances that extend outwardly away from said mounting portion into said trough.

4. The tray supporting and indexing apparatus defined by claim 1 wherein each of the supporting members have a mounting portion that is fixedly retained in a vertical wall forming a slotted out portion of said trough and wherein another wall portion of the trough that is opposite said first mentioned side wall portion is constructed to provide a contacting surface against which a ring portion formed on a face of any one of said trays can be rotatably engaged and to provide a means of retaining the outer circumferential surface of said tray in spaced apart relationship with the base of the trough.

5. The tray supporting and indexing apparatus defined in claim 1 wherein each of its bowed shaped supporting members form lugs that extend from an inner side wall of the trough in a direction toward an outer side wall of said trough and provide separate bearing surfaces on which any one of said trays can be brought into line contact therewith.

6. The single multi size tray supporting and indexing apparatus defined in claim 1 wherein the bowed shaped members are sideably mounted in the side of a trough of the projector and a member covering an upper edge portion of the top of said last mentioned side of the trough is employed to retain the bowed shape members from moving in a vertical direction in the trough.

7. The single multi size tray supporting and indexing apparatus defined in claim 1 wherein wherein the bowed shaped members are sideably mounted in said vertical side of a trough of the projector, a member covering an upper edge portion of the top of said last mentioned side of the trough is employed to retain the bowed shaped members from moving in a vertical direction in the trough and wherein the slidable portion of each of said bowed shaped members is provided with a characteristically shaped protuberance for engaging a separate slot in said vertical side wall of the trough to retain the bowed shaped members against movement in a horizontal direction therein.

* * * * *